United States Patent [19]

Frank et al.

[11] E Re. 29,560

[45] Reissued Feb. 28, 1978

[54] PEAK LOAD LEVELLING SYSTEM

[75] Inventors: Kjell Frank; Kjeld Thorborg, both of Vasteras, Sweden

[73] Assignee: ASEA Aktiebolag, Vasteras, Sweden

[21] Appl. No.: 686,898

[22] Filed: May 17, 1976

Related U.S. Patent Documents

Reissue of:

[64] Patent No.: 3,932,799
Issued: Jan. 13, 1976
Appl. No.: 515,358
Filed: Oct. 16, 1974

[30] Foreign Application Priority Data

Oct. 23, 1973 Sweden ..... 7314350

[51] Int. Cl.[2] ..... H02M 7/00

[52] U.S. Cl. ..... 363/71; 323/102; 323/119; 323/123

[58] Field of Search ..... 321/27 R; 323/102, 106, 323/119, 123, 127, 128; 307/80, 85; 363/65, 71

[56] References Cited

U.S. PATENT DOCUMENTS

| | | | |
|---|---|---|---|
| 3,448,285 | 6/1969 | Stackegard | 307/85 |
| 3,740,638 | 6/1973 | Thorborg | 323/19 |
| 3,745,437 | 7/1973 | Brown | 323/119 |
| 3,768,001 | 10/1973 | Thorborg | 323/102 |

*Primary Examiner*—William M. Shoop
*Attorney, Agent, or Firm*—Watson, Cole, Grindle & Watson

[57] ABSTRACT

A load levelling system for connection to an alternating current network includes an electro-chemical direct current source and line-commutated controllable convertor means having DC terminals connected to the supply source and AC terminals for connection to the network. A continuously reactive power generating system composed of a fixed capacitor battery and a line-commutated reactive convertor is connected to the AC terminals. The convertor means may include a first convertor and a second convertor, the first convertor having a higher rated voltage than the second, with a control angle arrangement for the first convertor. The convertors are series-connected through their DC terminals and have a transformer connecting their AC terminals.

4 Claims, 7 Drawing Figures

PEAK LOAD LEVELLING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a peak load levelling system in an AC network.

2. The Prior Art

It is known that there is normally a considerable difference between the greatest and the smallest output power from a power supply network during, for example, 24 hours. In principle the power-generating members in the network as well as the network itself (lines, transformers, etc.) must be dimensioned for the highest power which may occur, which involves, on the one hand, high investment costs, and, on the other, a reduced efficiency of the generating members which work with part load for the greater part of the time. By levelling the load output, i.e. reducing the difference between maximum and minimum power output, essential advantages can be obtained. For one thing, the power-generating members can then be dimensioned for lower rated power, and, for another, these members will work with a higher and more constant load, which results in a higher degree of efficiency. If, in addition, the levelling of the load output can be made in the power supply network near the consumers, further advantages are obtained in the form of reduced demands on the power-transmitting capacity of the network.

SUMMARY OF THE INVENTION

The purpose of the invention is to provide a load levelling system by means of which the said advantages are obtained.

The invention is further based on the fact that the peak loads as a rule are short and that they therefore represent relatively small amounts of energy. It is therefore possible to obtain a considerable levelling of the total load output from the network with the aid of energy-storing or energy-generating means of reasonable capacity.

A system according to the invention comprises means of this kind, which are arranged to take up and/or give off energy in the form of electrical DC energy. Preferably, these means are of an electrochemical kind, for example accumulator batteries, which are adapted to take up energy during a low-load period and emit energy during a high-load period. Alternatively, fuel cells can be used which are then arranged to emit energy during high-load periods.

For converting DC energy to AC energy and vice versa it is conventional to use controllable static convertors. A conventional line-commutated convertor, however, consumes a considerable amount of reactive power whenever it is not working with full maximum positive or negative direct voltage. In a system to which the invention relates the direct voltage may vary by ±20–30% and the alternating voltage by ±5% in a typical case. This means that as a rule the convertor would work with considerably less than full maximum positive or negative direct voltage, and thus have a high reactive power consumption. This would therefore necessitate great and cost-demanding measures to compensate for this consumption.

It is known per se that the reactive power consumption can be reduced or eliminated by the use of self-commutated convertors. However, such convertors are complicated and for this and other reasons they will be very expensive at the high powers which will occur in a system of a type to which the invention relates.

One further object of the invention is to obtain a system in which the advantages of the line-commutated convertor, in the form of simple and compact construction, reliability and a low price, are combined with the low reactive power consumption of the self-commutated convertor.

According to the invention, a load levelling system includes electro-chemical direct current energy supply means to which are connected the DC terminals of a line-commutated controllable electronic power convertor means. The AC terminals of the convertor means are connected to the AC network. A continuously controllable reactive power generating means composed of a fixed capacitor battery and a line-commutative reactive power convertor is connected to the AC terminals. The convertor means may comprise first and second convertors which are series-connected through their DC terminals and have transformer means connecting their AC terminals. The first convertor has a higher rated voltage than the second convertor, and is provided with means for setting the control angle to either of one or two substantially fixed values, corresponding to full direct voltage in rectifying and in inverting operation, respectively.

BRIEF DESCRIPTION OF THE DRAWINGS

In the following the invention will be described with reference to the accompanying drawings. FIG. 4b shows the design of the transformer used in FIG. 4a.

DESCRIPTION OF THE PREFERRED EMBODIMENTS

Figure 1:
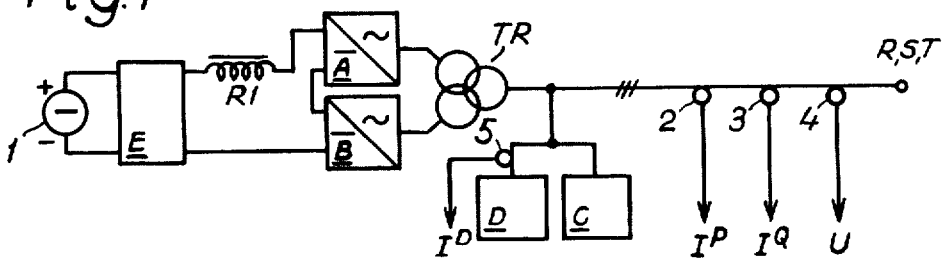
FIG. 1 shows a block diagram of a system according to the invention.

In FIG. 1 the energy-storing and/or energy generating means 1 has been shown symbolically as a DC voltage source. It is connected to the two convertor connections A and B by way of a pole reversal switch E and a smoothing reactor R1. Said convertor connections are DC voltage-series-connected, i.e. the sum of their DC voltages is equal to the voltage across the means 1. Their AC voltage terminals are connected to a winding each of a transformer TR, which also has a winding connected to the terminals R, S and T. These terminals are intended for connecting the system to the AC network the load variations of which are to be levelled. To these terminals the means C and D for reactive power compensation are connected. The means C consists of a capacitor battery and the means D of a reactive power convertor. Measuring means 2, 3 and 4, known per se, are arranged to generate signals which correspond to the active current component $I^P$, to the reactive current component $I^Q$ and the mains voltage U, and said signals can be used for controlling the system in a manner which is to be described in the following.

Figure 2:
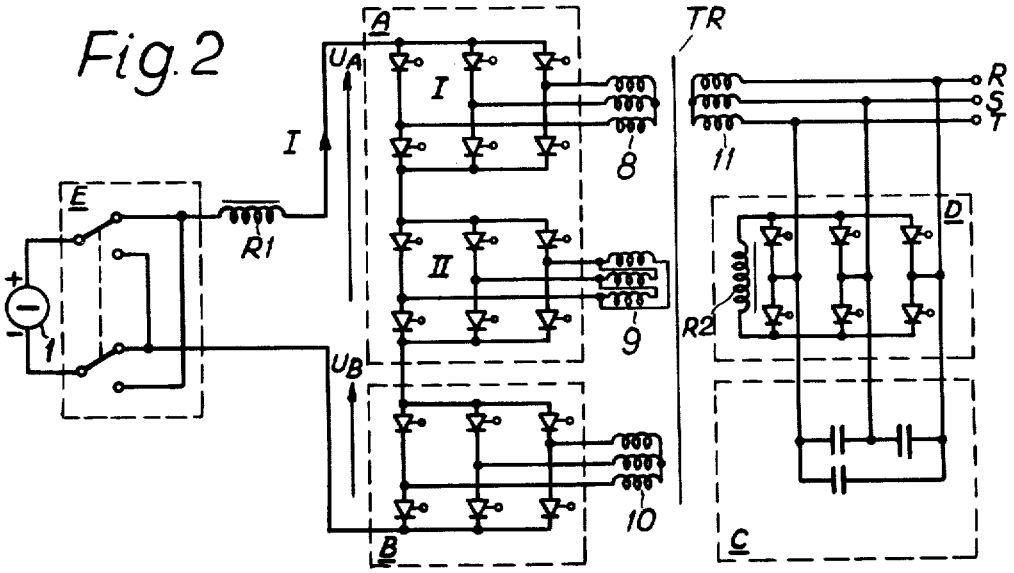
FIG. 2 shows the power circuits and [FIG. 3 the control circuits of the system.]

FIG. 2 shows the main circuits of the system. In the example the convertor connection A comprises two three-phase line-commutated thyristor bridges I and II of conventional type. The bridge I is connected to a star-connected winding 8 of the transformer TR and the bridge II to a delta-connected winding 9. These two bridges are arranged to be controlled with a substantially constant delay angle $\alpha$, which is the same for both bridges. The delay angle is arranged either to correspond to substantially maximum direct voltage in rectifying operation (e.g. $\alpha$ equal to 10°-30°) or to maximum direct voltage in inverting operation (e.g. $\alpha$ equal to 150°).

In the example the convertor connection B comprises one single bridge of the same type as the bridges I and II. This bridge is continuously controllable between full direct voltage in rectifying operation (e.g. $\alpha = 10°$) and full direct voltage in inverting operation (e.g. $\alpha = 155°$). It is connected to a winding 10 on the transformer TR.

Because the windings 8 and 9 are differently connected, the direct voltages from the windings will have different phase positions, i.e. the windings have different circuit angles. This results in a reduction of those current and voltage harmonics in the AC network which are generated by the convertors I and II.

When the pole reversal switch E is in the position shown in the figure, power is fed from the source 1 to the convertor connection and from there by way of the transformer TR and the terminals R, S, T out on the network. The convertor connection A then works in full inverting operation with constant control angle and with the constant direct voltage $U_A$. If also the convertor B works in inverting operation its direct voltage $U_B$ has the polarity shown in the figure. If it works in rectifying operation $U_B$ has the opposite polarity. The greatest resulting direct voltage from the convertor connections will be $U_A$ plus the maximum value of $U_B$ in inverting operation. The smallest resulting direct voltage will be $U_A$ minus the maximum value of $U_B$ in rectifying operation.

In a typical case the direct voltage of the source 1 may vary by ±25%. The convertor connection A is then dimensioned so as to give a direct voltage which is equal to the nominal value of the voltage of the source 1. The convertor B is then dimensioned to give a maximum direct voltage of about 25% of said value. The total direct voltage can then always be controlled to be in agreement with the voltage of the source 1.

In practice voltage drops in the DC circuit and the AC circuit must also be taken into account when determining the dimensions, as well as variations in the voltage of the AC network and the fact that the maximum direct voltage in inverting operation as a rule is somewhat lower than the maximum voltage in rectifying operation.

When the direction of power is the opposite to what has been described above, i.e. power is fed (during low-load periods) from the AC network to the energy-storing device 1, the pole reversal which E is placed in a direction opposite to the direction shown in the figure. The convertor connection A then has maximum direct voltage in rectifying operation and its direct voltage has a polarity opposite to thaat shown in the figure. By continuously controlling the convertor B, the resulting direct voltage can be controlled to the desired value also in this case.

Since the convertor connection A always works with full direct voltage (in rectifying or inverting operation) its consumption of reactive power is very low. The convertor B is dimensioned for considerably lower voltage and therefore has a low rated power, and its maximum consumption of reactive power is low.

The means for emitting a controllable reactive power consist of the three-phase capacitor battery C and the reactive power convertor D. The capacitor battery is adjusted so as to be able to generate the maximum reactive power consumed by the convertors. The reactive power convertor D consists, in a manner known per se, of a line-commutated controllable convertor, the DC terminals of which are connected to each other by a reactor R2. The convertor will always work with a control angle which is closed to 90°. By small alterations in the control angle the current, and therefore the consumed reactive power, can be controlled continuously between zero and a maximum value. The latter is chosen in principle to be as great as the power of the capacitor battery. This makes it possible to continuously control the total reactive power emitted by the means C and D to the network between zero and said maximum value, and in this way the reactive power consumed by the system from the network can be maintained at zero at any moment, if desired.

Since the rated power of the capacitor battery as well as of the reactive power convertor is determined by the rated power of the convertor B, which is low, the rated power of the reactive-compensating means will be low, which results in low investment costs, low losses and small space-requirements.

If desired, the capacitor battery and also the reactive power convertor can be given more ample dimensions than what is required according to the above, so that the system will be able to generate an excess of reactive power to the network for compensation of other reactive power consumers connected to the network.

Figure 3A:
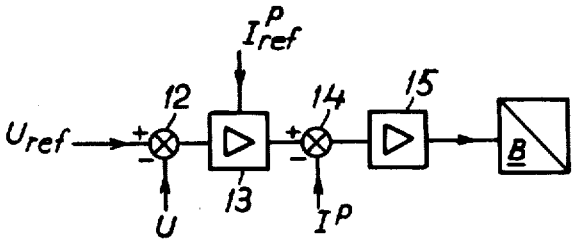
*FIGS. 3a and 3b show the control circuit for convertors B and D respectively.

FIG. 3a illustrates how the control of the convertor B can be carried out. A signal $U_{ref}$, corresponding to the desired mains voltage, is compared in the comparison circuit 12 with the value of the actual mains voltage U obtained from the measuring device 4. The difference, i.e. the voltage error, is supplied to the voltage regulator 13. This emits a signal to the comparison device 14, said signal being a desired value of the current and being compared with the value of the active component $I^P$ of the current obtained from the measuring device 2. The difference between said two values is supplied to the current regulator 15, the output signal of which is supplied to the convertor B where it affects the control angle by way of the control pulse device of the convertor.

The voltage regulator 13 is provided with an adjustable limitation of the output signal of the regulator. The regulator is supplied with a signal $I_{ref}^P$ which determines to which value the output signal is limited. The output signal which is the desired value of the active component of the current, as mentioned above, can thus be smaller than but not greater than the value $I_{ref}^P$.

The regulating system thus strives to maintain the desired value ($U_{ref}$) of the mains alternating voltage, the active current fed on to the network, however, being limited upwards to the value $I_{ref}^P$. In the normal case, when the system is connected to a rigid network, it is possible, by a suitable adjustment of $U_{ref}$, to make the system work constantly with an active current which is equal to $I_{ref}^P$. By means of $I_{ref}^P$ the active power fed from the system to the network can thus be adjusted to the desired value.

The mains alternating voltage in the vicinity of the system will be automatically limited upwards to the value $U_{ref}$. In this way security against too great voltage deviations is obtained, which would otherwise occur during low-load periods in the network combined with a high value of $I_{ref}^P$. The voltage control shown can alternatively be performed with the aid of the reactive power convertor D.

Figure 3B:
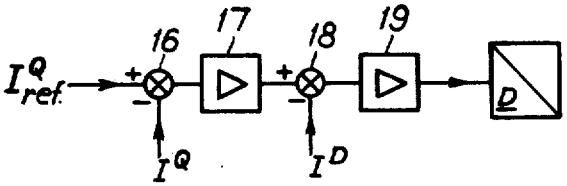

FIG. 3b shows an example of how the controlling of the convertor D can be performed. A desired value $I_{ref}^Q$ is compared in a comparison device 16 with the value, obtained from the measuring device 3, of the total reactive current $I^Q$ fed from the system to the network. The difference is supplied to a reactive current regulator 17, the output signal of which, which is limited to a suitable value, constitutes the value of the desired current of the convertor D. This desired current value is compared in the comparison device 18 with the value of the convertor current $I^D$ obtained from the measuring device. The difference is supplied to the current regulator 19, the output signal of which is supplied to the convertor D where it effects the control angle of the convertor.

Thus, bearing in mind that the allowable maximum current of the convertor must not be exceeded, the control system for the convertor D will feed a reactive power from the system to the network corresponding to the desired value $I_{ref}^Q$. $I_{ref}^Q$ can of course be set to zero, and no reactive power will then be consumed or generated by the system.

Figure 4A:
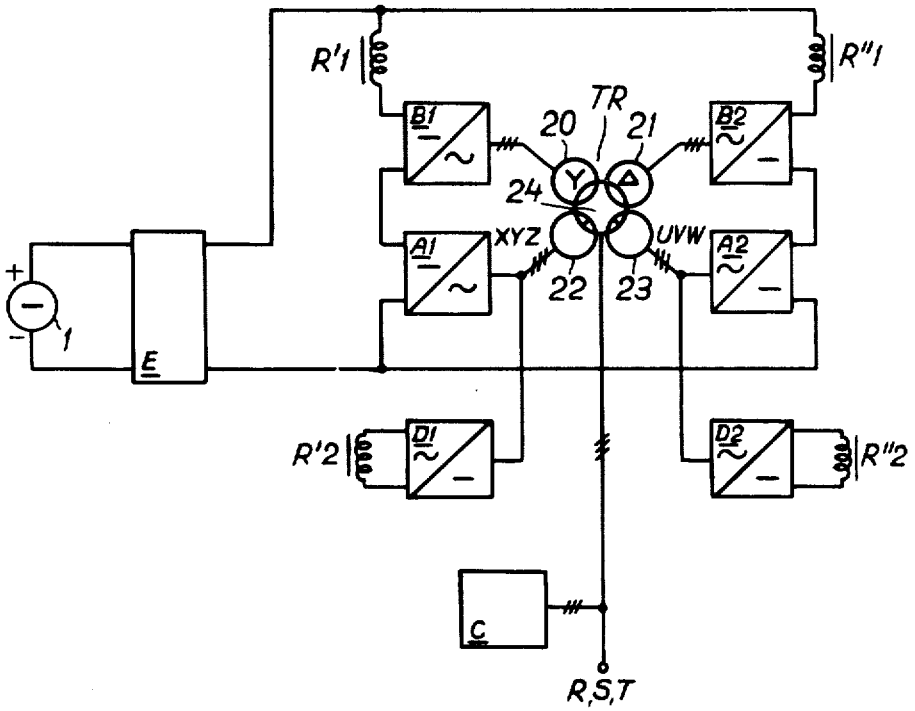
* FIG. 4a shows a block diagram of the main circuits of an alternative embodiment.

FIG. 4 shows a block diagram of an alternative embodiment of a system according to the invention. The designations correspond to those used in FIGS. 1 to 3. The convertor portion is here divided into two parallel-working parts. One part consists of the convertor connections A1 and B1 which are direct voltage-series-connected and connected to the source 1 by way of the reactor R'1. Each convertor connection is connected to a winding, 22 and 20, respectively, of the transformer TR. The reactive power convertor D1 is connnected to the same winding as A1. The DC terminals of D1 are short-circuited over the reactor R'2. The second part is identical with the first and comprises the reactor R''1, the convertor connections A2 and B2, and the reactive power convertor D2 with the reactor R''2. Like A in FIGS. 1 to 3, the convertor connections A1 and A2 are designed for higher voltage than B1 and B2 (B in FIGS. 1 to 3). A1 and A2 are arranged to work with a substantially fixed control angle, corresponding to either full inverting operation or full rectifying operation. B1 and B2 are continuously controllable between full inverting and full rectifying operation. The capacitor battery C, for example, has such a rated power that it is able to compensate the combined reactive power consumption from the convertors A1, A2, B1 and B2.

The controlling is performed in the same manner as in the example according to FIGS. 1 to 3. The two parts (A1, B1, D1 and A2, B2, D2, respectively.) are suitably provided each with a current regulating system to ensure that the total current is distributed equally between the two halves.

The convertor B1 is connected to a star-connected winding 20 on the transformer TR and the convertor B2 to a delta-connected winding 21. These two windings are galvanically separated from each other and from the other windings of the transformer. The alternating voltages to B1 and B2 will be mutually offset 30° in phase, and the harmful influence on the AC network from these two convertors will be minimized.

Similarly, the windings 22 and 23 may be galvanically separated windings, of which one is star-connected and one delta-connected, the harmful influence on the AC network from the convertors A1, D1, A2 and D2 thus being minimized.

Figure 4B:
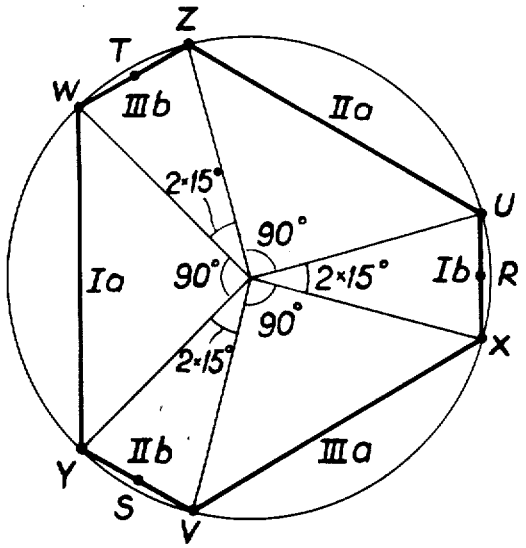

According to one embodiment of the invention the rated power of the transformer can be considerably reduced by constructing the windings 22 and 23 and the winding 24, which is connected to the network, in accordance with FIG. 4b. The transformer has terminals for three three-phase systems. The terminals R, S, T are intended for connection to the network, the terminals XYZ for connection to the convertors A1 and D1, and the terminals UVW for connection to the convertors A2 and D2. The transformer has three legs, each having two windings. The winding voltages are shown in vector form in FIG. 4b. A first transformer leg has a winding Ia between the terminals Y and W and a winding Ib between terminals X and U with a centre connected to the terminal R. A second transformer leg has a winding IIa between the terminals Z and U and a winding IIb between the terminals V and Y with a center tap connected to the terminal S. The third transformer leg has a winding IIIa between the terminals X and V and a winding IIIB between the terminals W and Z with a center tap connected to the terminal T. The number of turns of the windings are so adjusted that the angles shown in FIG. 4b are obtained, i.e. the ratio between the voltage from the greater and the smaller winding of each transformer leg is to be sin 45°/sin 15°. The systems XYZ and UVW then form two symmetrical three-phase voltage systems which are mutually displaced 30°. The windings Ia, IIa and IIIa may alternatively be connected between the points S and T, T and R and S, respectively.

If it is desirable for the system to maintain the supply to the network in case the mains alternating voltage is cut off, this can be achieved by completing the control equipment of the system in the manner disclosed in the U.S. Pat. No. 3,699,425. In case of AC voltage dropout a free-running oscillator takes over the convertor control, and the connection will work as a self-commutated unit (inverter) in the manner described in the patent specification mentioned. In this mode of operation the priciples disclosed in U.S. Pat. Nos. 3,740,638, 3,768,001 and 3,829,759 may be used.

In such embodiments of the invention where only one of the directions of power flow (from the source 1 to the network) is to be used, the pole reversal switch E can of course be omitted.

In the preferred embodiments described above the convertors B have been assumed to be continuously controllable between full inverting operation and full rectifying operation. In principle it is sufficient if the convertors B are made controllable within only part of this range. Similarly, they may be discontinuously controllable in a number of steps.

Instead of the fixed capacitor battery C and the reactive power convertors D other means generating variable reactive power may be used, for example capacitor batteries which are controllable in steps by means of contactors or thyristors.

In the connection shown in FIG. 2 the convertors I, II and B may of course be direct voltage series-connected in an arbitrary order. The convertor B, for example, may be connected between the two convertors I and II.

As an alternative, the two convertors I and II in FIG. 2 may be connected to the network by way of a separate transformer each. The AC side of each of these two convertors may then be connected each to a means for emitting a controllable reactive power, and the reactive power-generating means on the network side of the transformer in FIG. 2 may therefore be omitted. Each of these means may then consist of a fixed capacitor battery which is AC-parallel-connected to a reactive power convertor. A harmonic filter may be connected in parallel with the capacitor battery.

If, as has been mentioned now, the convertors I and II have separate transformers, "the second convertor connection" (B is FIG. 2) may be connected to an extra winding on one transformer in series with an extra winding on the second transformer.

As mentioned above the DC supply means (1 in FIG. 2) may consist of an accumulator battery. It is then possible to charge the battery during the night, when the load of the AC network is low. The main convertor (A and B of FIG. 2) is then run as a rectifier. In the daytime, when there is a high load on the AC network, the main convertor is run as an inverter and energy from the battery is supplied to the network. Generally, the low-load period at night is fairly short, in a typical case of only 4 to 8 hours' duration. The rate of charging of the battery, therefore, must be higher than the maximum rate of discharge. According to one aspect of the invention the desired high charging rate is obtained without an increase in the rated power of the convertors of the system. This effect is obtained by using the reactive power convertor D for charging the battery during the low-load periods. The DC terminals of this convertor are then connected in series with the reactor R2 to the battery (1). Preferably a simple switching means is arranged for connecting the convertor (D) and the reactor R2 to the battery during night-time charging. The convertor D is then controlled by a current or charging control means, such as are well known per se. During this mode of operation the continuous control of reactive power is not possible. This is, however, no appreciable disadvantage as the AC network is lightly loaded when the battery is charged. For discharge of the battery when the high-load period starts the convertor D and reactor R2 are switched back to the connection shown in FIG. 1, and the convertor is then used for reactive power control as disclosed above.

The reactive power convertor (D) and the main convertor (A, B) have rated powers of the same order of magnitude. It is therefore possible in this way to obtain a charging rate which is approximately double the discharging rate and this corresponds fairly well to the practical need.

The mode of operation now described is of course not limited to the case where the DC supply means is a battery, but the DC supply may comprise any other known means for storing electrical DC energy.

In cases of emergency, such as when one of the power plants supplying the AC network breaks down, it may be advantageous to use the load levelling system according to the invention for temporarily supplying larger amounts of power into the AC network than during normal operation. In such cases the power factor control is secondary importance. It is, according to one aspect of the invention, possible then to connect the reactive power convertor (D) to the DC supply means in parallel with the main convertor (A, B). The ability to supply power to the AC network may then be doubled if the main convertor and the reactive power convertor have equal rated powers.

Figure 5:
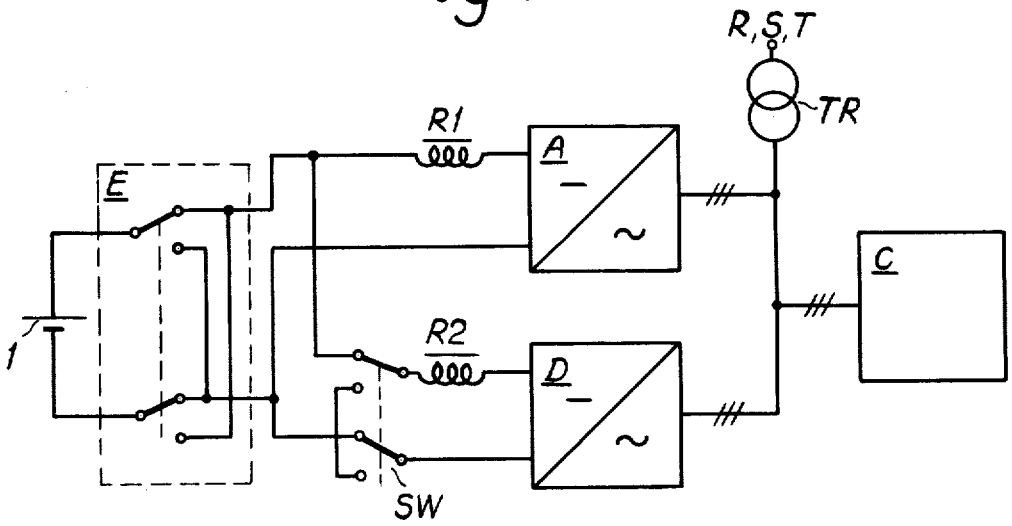
FIG. 5 shows a version of the system according to the invention.

FIG. 5 shows a version of the system according to the invention, by means of which a high charging rate (when the DC supply means is a battery) and a temporary high power flow from the DC supply means to the AC network may be obtained. A transformer TR is connected to the AC network R, S, T. To the low-voltage side of the transformer there are connected the capacitor battery (C), the main convertor (A) and the reactive power convertor (D). The main convertor may comprise a single convertor of several parallel or series-connected convertors, such as convertors A and B of FIG. 1. The same applies to the reactive power convertor (D). An advantage of having the capacitor battery (C) and the reactive power convertor (D) connected to the low-voltage side of the transformer (TR) is that the reactive power of the main convertor (A) is compensated on the same side of the transformer as it is consumed. It does not, therefore, have to flow through the transformer (TR), the rating of which may then be significantly lowered.

The main convertor (A) is connected, through the reactor R1 and the pole reversal switch (E), to the DC supply means 1, which may be an accumulator battery. The reactive power convertor (D), through its reactor R2 and a switch SW, also connected to the pole reversal switch E.

When the switch SW is, in the position shown in FIG. 5, the reactive power convertor (D) is connected in parallel with the main convertor (A). It is then possible to obtain a high charging rate of the battery (1) with the switch (E) in one position, and a correspondingly high rate of power flow from the battery (1) into the AC network.

Continuous control of the reactive power is not possible in this mode, but this is of no practical consequence, as mentioned above.

If the DC supply means is, for example, a battery of fuel cells, only the high rate of power flow from the cells to the AC network is, of course, of interest.

If, as mentioned above, the load levelling system according to the invention is provided with control means (for instance a free-running oscillator means) enabling it to work as a self-commutated unit to supply power to the AC network in case of the AC voltage being cut off, then the reactive power convertor (D) will normally have a higher rating than the main convertor (A). In this case the rate of power flow, when convertors A and D are connected in parallel, will be more than twice that of "normal" operation, when convertor A alone handles the power flowing into or out of the DC supply means 1.

When the switch SW is in the opposite position to that shown in FIG. 5, the DC terminals are short-circuited through reactor R2, in the same way as disclosed in FIGS. 1 and 2, and continuous reactive power control is possible as described in connection with these figures.

When working in parallel with the main convertor (A) the control system of the reactive power convertor (D) will have to be of the type shown in FIG. 3a, instead of the system of FIG. 3b, which is used when convertor D is used for reactive power control. Simple switching means may be used to switch over between the two control systems at the same time as switch SW is actuated.

If desired, two or more pairs of convertors (A and D in FIG. 5 form one pair) may be used, each with its own, transformer. The transformers of the various groups may then have different connections (one may be star-star and another delta-star connected). In this way the pulse number of the system may be raised and thus the harmful influence on the AC network from the convertors of the system may be reduced.

We claim:

1. Load levelling system for connection to an alternating current network (RST), said system comprising electrochemical direct current energy supply means (1), line-commutated controllable electronic power convertor means (A, B) having DC terminals connected to said energy supply means and AC terminals for connection to said AC network, and continuously controllable reactive power generating means (C, D) connected to said AC terminals, said reactive power generating means comprising a fixed capacitor battery (C) and a line-commutated reactive power convertor (D), [the convertor means comprising a first (A) and a second (B) line-commutated thyristor convertor connection, each convertor connection having DC and AC terminals, said convertor connection being series-connected through their DC terminals and having transformer means (TR) connecting their AC terminals, said first convertor connection (A) having a higher rated voltage than the second convertor connection (B), means for setting the control angle of said first convertor connection (A) to either one of two substantially fixed values, corresponding to full direct voltage in rectifying and in inverting operation, respectively, and means for controlling said second convertor connection (B) with a variable control angle], *said system including means for connecting the DC terminals of said reactive power convertor (D) to the energy supply means for supplying power to or from said energy supply means in parallel with said controllable electronic power convertor means (A, B).*

2. Load levelling system according to claim 1, comprising a pole reversal switch (E) connected between said energy supply means (1) and said convertor means (A, B).

[3. Load levelling system according to claim 1, including means for connecting the DC terminals of said reactive power convertor (D) to the energy supply means for supplying power to or from said energy supply means in parallel with said controllable electronic power convertor means (A, B).]

*4. Convertor equipment for connection between an AC network (R, S, T) and a DC network (1) and comprising at least two convertors (A, D) having AC terminals for connection to the AC network and DC terminals, an inductor (R2), and switching means (SW) for alternatively either connecting the DC terminals of one of said convertors (D) to said DC network (1) in parallel with the other convertors, or connecting said inductor (R2) between the DC terminals of said convertor (D).*

*5. Convertor equipment according to claim 4, comprising a pole reversal switch connected between said DC network and said convertors.*

* * * * *